Oct. 14, 1947.                A. M. SHORESMAN                2,428,922
                          LIQUID DISTRIBUTING APPARATUS
                             Filed Sept. 30, 1944

Inventor:
Allen M. Shoresman
By Lee J. Gary
   Attorney

Patented Oct. 14, 1947

2,428,922

UNITED STATES PATENT OFFICE 2,428,922

LIQUID DISTRIBUTING APPARATUS

Allen M. Shoresman, Chicago, Ill., assignor to Universal Oil Products Company, Chicago, Ill., a corporation of Delaware Application September 30, 1944, Serial No. 556,569

1 Claim. (Cl. 261—110)

This invention relates to an improved type of liquid distributor for use in a packed tower, or between contact beds in a reaction or reactor chamber.

This particular form of the apparatus which constitutes the invention was devised principally to be used between contact beds in a vertically disposed tower or chamber where more than one bed of packing or contact material is used. There are many types of chambers wherein Raschig rings, quartz chips, or other forms of packing are used as contact beds for countercurrent contact of liquids and vapors. The efficiency of such towers depends primarily upon uniform distribution of the down-flowing liquid through the packing, therefore it is desirable to provide a distributing means for the liquid to uniformly and centrally supply it to the bed of packing.

It is also desirable in towers or chambers having long sections of packing to redistribute the liquid at spaced intervals to prevent channeling of the liquid through only a small portion of the packing. The proposed apparatus provides an efficient means for redistributing the descending liquid passing from one section of the bed to another.

Another advantage of the distributor is that it can efficiently break up and distribute a liquid stream from an intermediate feed conduit coming into the chamber, as well as simultaneously act to redistribute channeled streams from an upper to a lower contact bed. It is often desirable to have an intermediate liquid feed line coming into a vessel in addition to one at the top. There is a further desirable feature in that all of the distribution of the liquid feed can be taken care of by the elements of the proposed distributor itself, thus allowing a single feed conduit to be used and eliminating the necessity of branch piping to feed at several points over any given distributing tray.

Broadly the new form of distributing apparatus comprises three horizontally disposed elements, the upper element, deflecting liquid streams descending from above along the outer periphery of the vessel, an intermediate plate-shaped element for deflecting any liquid streams descending centrally through the vessel, and a lower element which collects the deflected liquid streams from the above two elements, redistributing the liquid centrally to the contact bed below. This lower element is a ring-shaped tray having upturned walls to form dams so that a substantial liquid level may be built up in the tray, the inner circumferential wall has numerous slots or notches which act as outlet weirs to break the liquid into a multiplicity of small streams as it flows out of the tray and onto the contact bed below. The upward-flowing vapors through the chamber can rise through the round center opening of the lower tray as well as through the annular space formed by the tray's outer edge and the vessel wall. The vapors can continue upwardly around the intermediate deflector plate and on through the central opening of the top deflector ring. These upper two elements have their edges turned upward and are provided with a series of serrations which act to break the overflowing liquid into a large number of individual streams, thus the upward rising vapor does not have to break through a solid sheet of the descending liquid.

The amount of space between the elements should of course be such as to allow the ascending vapors to have adequate area for passage therethrough. It is also important of course that the upper two elements extend in a manner such as to cover the openings at the level of the lower tray, so that direct fall of liquid streams from one bed to another is prevented, this feature should be automatic, however, if the construction is such that the overflow from the top ring and from the intermediate plate, falls directly into the lower tray.

It is also contemplated that a plurality of drain or weep holes may be placed in the bottom of the lower distributing tray of the apparatus to give additional outlet streams if they are desired or needed to handle the quantity of descending liquid.

This apparatus for liquid distribution which comprises the invention may be found particularly useful in various treating towers in connection with hydrocarbon conversion processes, for instance it may be used in a caustic regenerator. For the particular caustic regenerator wherein this type of distributor is adaptable, caustic which had become fouled and contaminated with methanol and mercaptan products must be freed of the contaminating material by the use of superheated steam. The fouled caustic entering the top of the vessel gravitates downwardly through a deep Raschig ring bed while superheated steam entering the bottom of the vessel rises upwardly contacting the liquid and carrying off the methanol and mercaptans in vaporous form at the top of the vessel. The caustic liquid has a tendency to quickly channel itself against the vessel wall and the distributing apparatus placed at intermediate points acts to redistribute the liquid to the center of the bed thus obtaining an efficiently operating tower.

It is of course, within the scope of the invention to employ it in any system wherein liquid is to be distributed throughout a chamber or vessel containing packing material. The packing material as previously mentioned may be used as a contacting surface such as Raschig rings, Burrel saddles, etc., or it may comprise a catalyst to be used in the conversion of the reactants flowing therethrough.

The accompanying drawing and the following description thereof will serve to better illustrate the invention and its advantages.

Figure 1:
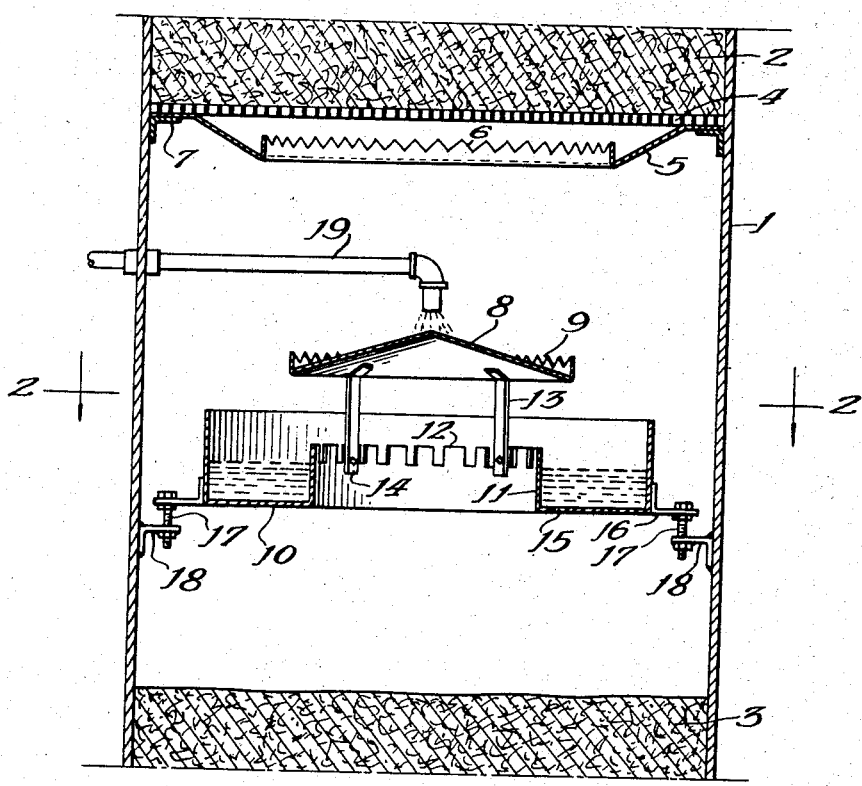
Figure 1 shows a sectional view through the distributor as installed in a vessel.

Referring now to Figure 1, the shell of the tower of chamber which contains the packing material and the distributor is marked 1. The upper bed of packing material is marked 2, while the lower bed of material indicated is marked 3. This material as before mentioned may be any one of several types of contact material or it may be a catalyst, also beds 2 and 3 may or may not be alike depending on the particular process involved. The upper bed of material 2 is supported on a screen or grating 4. Immediately below the grating 4 is the upper element 5 of the distributing apparatus, this ring-shaped upper element 5 acts to deflect the descending streams of liquid that are channeled against the outer shell 1 of the tower. The inner peripheral edge of this top ring 5 is upturned and serrated by a series of notches 6, the notches as shown are V-shaped, however they may be rectangular or any other desired shape. The angle member 7 should be continuous around the inside of the shell wall 1 and should be welded or otherwise well secured to the shell as it serves as the support for the grating 4 and the deflector element 5. The intermediate element 8 is a round deflector plate having an upturned edge, the central portion of the plate 8 is made humped-up or cone-shaped, thus descending liquid streams are deflected and overflow the edge through a series of serrations 9. These serrations 9, like the ones in 6 shown above may be of a different shape than that shown, their principal requirement being to break the overflowing liquid into a number of small streams. The dam-like upturned edges and serrations 9 and 8 of these upper elements 5 and 8 tend to give equal flow therefrom in addition to breaking the overflow into a multiplicity of streams which allow easy vapor flow upwardly through the entire distributor. The lower collecting element 10 is a ring-shaped tray which collects the downflowing liquid streams from the upper elements 5 and 8. The inner circular wall 11 of the lower tray 10 is provided with a series of notches or slots 12 which are placed equally around this entire inner wall 11 and act to redistribute the liquid to the bed 3 below. This inner wall 11 also may act to support the intermediate deflector 8 by means of bars or legs 13. These legs 13 may be welded or otherwise suitably secured to the plate element 8, but should be detachably secured by means of bolts 14 to the wall 11, thus providing a manway through the distributing apparatus.

A drain hole 15 should be provided to remove the liquid contained in the tray 10 in the event of a shut-down and drainage of the entire vessel is desired. Further, a circular series of such drain or weep holes may be provided if additional discharge capacity is needed from the tray 10. However, one of the principal advantages of this invention is obtaining the redistribution of the descending liquid to the center of the contact bed below, so that the building up of a liquid level and the entire flow being through slots 12 is the contemplated operation.

Lugs 16 are provided for the support of the bottom collecting tray 10, these lugs 16 rest on or are supported by means of leveling screws 17, or some similar adjustable means, with these adjusters 17 in turn being supported from lugs or clip angles 18 which may be welded or suitably secured to the vessel shell 1. The leveling screws 17 are a desirable feature so that the tray 10 and the liquid level in the said tray can be adjusted to give substantially equal flow through all of the slots around the entire inner wall 11.

The feed line 19 is optional since intermediate feed lines are used in some vessels and for certain treating processes only. The drawing with the feed conduit 19 however illustrates the way a liquid feed may be distributed to the bed of packing material in an even manner without the use of sprays or branch feed lines, along with the down-flowing liquid from the bed 2 above. In a similar manner the two elements 8 and 10, may be used above the top bed of packing to distribute the principal liquid feed for any vessel wherein packing material is used.

Figure 2:
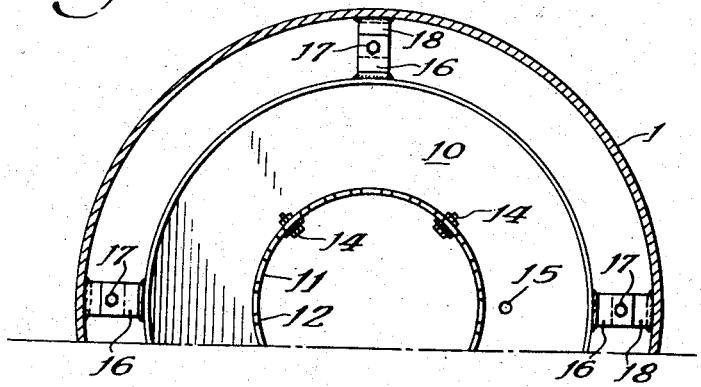
Figure 2 shows a plan view of the lower tray and is taken as indicated by the line 2—2.

Figure 2 is a sectional plan view along line 2—2, showing the shape of the tray 10 and the orientation of the supporting lugs and other pieces all of which are numbered the same as in Figure 1.

To give an example of the operation of the distributing apparatus reference will be made to the previously mentioned caustic regenerator. Channeled streams of liquid descending through the Raschig ring bed 2 will run through the grating 4 onto the deflector elements 5 and 8. These pieces having upturned serrated edges break up any concentrated streams into a number of small individual streams, and the liquid being thus divided allows the ascending steam and entrained vapors to pass upward without having to pass through a sheet of liquid. These small streams of the caustic liquid pour into the tray 10 which collects and then evenly redistributes the liquid through the slots 12. The rising vapors at this point may pass between the individual streams, formed by the slots 12, and ascend through the round central opening as well as though the annular space between the tray 10 and the shell 1. The caustic liquid is thus deposited centrally to the lower bed of rings 3, wherein it soon spreads out and is contacted by the rising superheated steam which has been fed in at the bottom of the regenerating tower.

A mercaptan absorber is another vessel wherein the invention is particularly adaptable. The gasoline with mercaptans entering the absorber at the bottom flows upwardly through the contact beds 3 and 2, countercurrently to caustic, which enters at the top of the vessel, and to concentrated methanol which enters intermediately in the contact bed through a feed line such as feed conduit 19. Both the caustic and methanol being heavier than the gasoline gravitate down and are given even distribution by the apparatus in their downward flow through the contact bed. The caustic and methanol absorb out the mercaptans from the gasoline as the contact is made in the bed allowing the gasoline to be drawn off the top of the vessel substantially free of mercaptans.

It is of course not intended to limit the use of this type of distributor to the previously named process chambers, as it may well be used in any chamber having packing material and for any type of liquid flowing downwardly therethrough, counter-current to an ascending vaporous or liquid material.

The drawings and description may infer that the various component parts are fabricated from sheet metal or plate, however, it is within the scope of the invention to cast the various sections. In either case the material may be carbon steel or of a suitable alloy, depending on the types of liquids or vapors involved in the process.

I claim as my invention:

In a cylindrical contacting chamber having a pair of vertically spaced beds of solid contact material, the combination of a ring shaped deflector depending downwardly and inwardly of the chamber from the lower peripheral portion of the upper bed of contact material and having a central opening below said upper bed, an annular trough disposed between said deflector and the lower bed of contact material, the inner wall of said trough forming a cylindrical overflow passage above the central portion of said lower bed and the outer wall of the trough being spaced from the walls of said chamber to provide an annular vapor passage around the trough, and a conical deflector disposed between said ring shaped deflector and said trough in vertical alignment with said central opening and cylindrical overflow passage and overlapping the latter for diverting into the trough liquid descending from the central portion of the upper bed through the central opening of the ring shaped deflector.

ALLEN M. SHORESMAN.

REFERENCES CITED

The following references are of record in the file of this patent:

UNITED STATES PATENTS

| Number | Name | Date |
|---|---|---|
| 982,404 | Wiki | Jan. 24, 1911 |
| 1,216,747 | Taggart | Feb. 20, 1917 |
| 1,399,294 | Engel | Dec. 6, 1921 |
| 1,951,024 | Kittredge | Mar. 13, 1934 |
| 2,125,343 | Hochschwender | Aug. 2, 1938 |
| 1,929,403 | Byer | Oct. 10, 1933 |